US008724051B2

(12) United States Patent
Adachi

(10) Patent No.: US 8,724,051 B2
(45) Date of Patent: May 13, 2014

(54) BACKLIGHT DEVICE, AND LIQUID CRYSTAL DISPLAY USING THE SAME

(75) Inventor: Takeshi Adachi, Kumagaya (JP)

(73) Assignees: Mitsumi Electric Co., Ltd., Tokyo (JP); ATRC Corporation, Saitama (JP)

( * ) Notice: Subject to any disclaimer, the term of this patent is extended or adjusted under 35 U.S.C. 154(b) by 476 days.

(21) Appl. No.: 12/677,839

(22) PCT Filed: Sep. 19, 2008

(86) PCT No.: PCT/JP2008/067007
§ 371 (c)(1),
(2), (4) Date: Mar. 12, 2010

(87) PCT Pub. No.: WO2009/038187
PCT Pub. Date: Mar. 26, 2009

(65) Prior Publication Data

US 2010/0225848 A1 Sep. 9, 2010

(30) Foreign Application Priority Data

Sep. 20, 2007 (JP) ................................ 2007-243261
Sep. 18, 2008 (JP) ................................ 2008-239735

(51) Int. Cl.
*G02F 1/1335* (2006.01)

(52) U.S. Cl.
USPC ............................................................ 349/61

(58) Field of Classification Search
USPC ............................................................ 349/61
See application file for complete search history.

(56) References Cited

U.S. PATENT DOCUMENTS

| | | | | |
|---|---|---|---|---|
| 2006/0066266 | A1 * | 3/2006 | Li Lim et al. | 315/291 |
| 2007/0064422 | A1 * | 3/2007 | Murai | 362/231 |
| 2008/0024696 | A1 | 1/2008 | Arai et al. | |
| 2009/0160756 | A1 * | 6/2009 | Van Beek et al. | 345/102 |

FOREIGN PATENT DOCUMENTS

| | | |
|---|---|---|
| CN | 1830096 A | 9/2006 |
| JP | 07-191311 | 7/1995 |
| JP | 2004-071902 | 3/2004 |
| JP | 2006-133721 | 5/2006 |
| JP | 2006-237282 | 9/2006 |
| JP | 2007-141834 | 6/2007 |

OTHER PUBLICATIONS

Chinese Office Action mailed Aug. 10, 2011.

* cited by examiner

*Primary Examiner* — Timothy L Rude
(74) *Attorney, Agent, or Firm* — IPUSA, PLLC

(57) ABSTRACT

A backlight device includes a light source configured to light a liquid crystal panel from a back surface of the liquid crystal panel, wherein the light source includes a white light emitting diode, and a colored light emitting diode portion.

4 Claims, 14 Drawing Sheets

(a) DIRECT TYPE BACKLIGHT DEVICE (b) EDGE TYPE BACKLIGHT DEVICE (a) CASE OF RGB (b) CASE OF RGGB (a) CASE OF W+RGB (b) CASE OF W+RB (a) WHITE LED LIGHTING TIMING (b) COLORED LED PORTION LIGHTING TIMING

BACKLIGHT DEVICE, AND LIQUID CRYSTAL DISPLAY USING THE SAME

TECHNICAL FIELD

The present invention relates to a backlight device and a liquid crystal apparatus using the same, and more specifically, to a structure and a driving method of a light emitting diode capable of realizing accurate color reproduction and color balance at low cost.

BACKGROUND ART

Conventionally, there is known a liquid crystal display apparatus which can display an image on a liquid crystal panel. At present, the main type of the liquid crystal apparatuses displays a color picture by illuminating a transmissive liquid crystal display panel having a color filter from the backside of the transmissive liquid crystal display panel. Although cold cathode fluorescent lamps (CCFL) using fluorescent tubes have been largely used for backlights, use of mercury is being limited now because of environmental concerns. Therefore, light emitting diodes (LED) have begun to be used as light sources instead of CCFLs containing mercury (for example, see Patent Document 1).

Further, the backlight devices are roughly classified into two types, i.e. a direct type and an edge type depending on arrangement of light sources. The direct type is formed by arranging a light source on an immediate back side of a liquid crystal panel as illustrated in FIG. 2(*a*). The edge type is formed by arranging a light guide plate on an immediate back side of a liquid crystal panel and arranging a light source on a side surface of the light guide plate as illustrated in FIG. 2(*b*). The edge type backlight-system illustrated in FIG. 2(*b*) has been used for liquid crystal panels having a relatively small size used for, for example, mobile phones and notebook-sized personal computers. However, because it is impossible to obtain a sufficient luminance for a large-sized liquid crystal panel when the edge type backlight-system is applied, a direct type backlight device may be used.

In the direct type backlight device using the light emitting diodes as the light source, there are a system of using white light emitting diodes as the light source and a system of obtaining white light by mixing colors from the light emitting diodes emitting red light, green light and blue light as illustrated in FIG. 3(*a*).

There is a method of emitting white light using light emitting diodes emitting three primary colors of red light, green light and blue light, the method employing a unit including two green light emitting diodes having the highest visibility for luminance, one red light emitting diode and one blue light emitting diode as illustrated in FIG. 3(*b*). With this structure, a color mixing performance for obtaining white color is enhanced, color unevenness and luminance unevenness are restricted, and power consumption is reduced (see, for example, Patent Document 2).

[Patent Document 1]
Japanese Laid-open Patent Publication No. 7-191311
[Patent Document 2]
Japanese Laid-open Patent Publication No. 2006-133721

DISCLOSURE OF THE INVENTION

Problems to be Solved by the Invention

However, although it is possible to realize a backlight device using only white light emitting diodes according to the conventional technique at a relatively low cost, it is not possible to adjust the color temperature of the backlight. However, television sets are ordinarily designed to change the color temperature from about 6500 K thru 12000 K (sometimes 15000 K) depending on a picture content and a user's taste.

A case of changing the color temperature of a liquid crystal television set using white light emitting diodes as a backlight is described next. Referring to FIG. 1, the abscissa represents color temperature and the ordinate represents luminance of a liquid crystal television set. In a case where the color temperature of the white (W) light emitting diodes used as a backlight source is set to, for example, 10000 K, and the color temperature of the liquid crystal television set is changed in a range illustrated in FIG. 1(*c*), namely (1) 6500 K thru (2) 13500 K, the following issue occurs.

For example, when a color temperature of 6500 K is set, the color temperature is changed by reducing a blue (B) signal of picture signals R, G and B as long as the color temperature of the white light emitting diodes is unchangeable. When the B signal level is reduced, the luminance is also reduced due to a relationship between the color temperature and the luminance as indicated by a point (1) of FIG. 1(*a*). On the contrary, when a high color temperature of 13500 K is set, the red (R) signal is reduced. The relationship between the color temperature and the luminance is indicated by a point (2) of FIG. 1(*a*), in which the luminance is likewise reduced. When dispersion exists among the white light emitting diodes, there occurs a problem that the luminance level is unstable.

In case of a backlight device using light emitting diodes respectively emitting three primary colors of red light, green light and blue light, it is possible to adjust the color temperature and correct color unevenness of a backlight. However, there are problems such that the luminance is not stabilized and cost reduction is difficult due to the dispersion among the light emitting diodes.

Accordingly, the present invention may provide a backlight device enabled to adjust the color temperature and correct the luminance unevenness and the color unevenness by using both of a white light emitting diode and colored light emitting diodes at low cost, and a liquid display apparatus using the backlight device solving one or more of the problems discussed above.

Means for Solving Problems

In order to achieve the above objects, there is provided according to a first aspect of the invention a backlight device including a light source configured to light a liquid crystal panel from a back surface of the liquid crystal panel, whereby the light source is characterized by including a white light emitting diode and a colored light emitting diode portion.

Therefore, it is possible to use both the white (W) light emitting diode and the colored light emitting diode portion as the light source. In addition, color temperature adjustment and correction of luminance unevenness and color unevenness are carried out while combining the white (W) light emitting diode and the colored light emitting diode portion. Therefore, a luminance level may be stabilized and minutely adjusted.

A second aspect of the invention is characterized in the backlight device according to the first aspect in that the white light emitting diode is a high power type diode which exerts a luminance higher than that of the colored light emitting diode portion.

Therefore, most of the luminance necessary to light the liquid crystal panel is supplied by the white (W) light emitting diode, and color temperature adjustment and correction of luminance unevenness and color unevenness are minutely carried out by the colored light emitting diode portion. Therefore, a luminance level may be stabilized and minutely adjustable.

A third aspect of the invention is characterized in the backlight device according to the second aspect in that the colored light emitting diode portion includes a red light emitting diode and a blue light emitting diode.

Therefore, it is possible to use the red (R) light emitting diode which emits a red light having a low color temperature and the blue (B) light emitting diode which emits a blue light having a high color temperature by combining these, as the colored light emitting diode portion. Therefore, a color temperature or the like may be minutely adjusted.

A fourth aspect of the invention is characterized in the backlight device according to the third aspect in that the colored light emitting diode portion further includes a green light emitting diode.

Therefore, it becomes possible to make pseudo-white using three primary colors. Therefore, color temperature adjustment and correction of luminance unevenness and color unevenness can be minutely carried out with high accuracy.

A fifth aspect of the invention is characterized in the backlight device according to the fourth aspect by further including a light emitting diode driving unit configured to light the white light emitting diode and the colored light emitting diode portion while shifting lighting timings of the white light emitting diode and of the colored light emitting diode portion.

Therefore, it is possible to reduce power consumption of the backlight device. Further, for example, it is possible to stop lighting the colored light emitting diode portion while the white (W) light emitting diode is lighted. On the other hand, it is also possible to stop lighting the white (W) light emitting diode while the colored light emitting diode portion is lighted. Then, effective power input in the light emitting diodes may be reduced to achieve low power consumption, and lifetimes of the light emitting diodes may be prolonged. Thus, an economical backlight device can be provided.

A sixth aspect of the invention is characterized in the backlight device according to the fifth aspect that the light emitting diode driving unit includes a pulse-width modulation circuit, a white light emitting diode driving circuit configured to light a white light emitting diode based on a pulse of a first polarity which is output from the pulse-width modulation circuit, and a colored light emitting diode driving circuit configured to light the colored light emitting diode portion based on a pulse of a second polarity, which is output from the pulse-width modulation circuit as having a polarity opposite to the first polarity.

Therefore, it is possible to easily switch over between lighting of the white (W) light emitting diode and lighting of the colored light emitting diode portion using the pulse-width modulation circuit, and to reduce power consumption.

A seventh aspect of the invention is characterized in the backlight device according to the sixth aspect in that the light emitting diode driving unit includes a sequential driving unit configured to sequentially light colored lights from the colored light emitting diode portion.

Therefore, it is possible to further reduce power consumption by sequentially lighting color lights of the colored light emitting diode portion. For example, the red (R) light emitting diode, the green (G) light emitting diode and the blue (B) light emitting diode are used as the colored light emitting diode portion. In a sequential driving mode in which the red (R) light emitting diode, the green (G) light emitting diode and the blue (B) light emitting diode are sequentially driven, the electric current supplied to the colored light emitting diode portion is reduced to one-third of the current value under a drive other than the sequential drive. Then, it is possible to further reduce power consumption, and to diminish luminance unevenness and color unevenness.

A liquid crystal display apparatus according to an eighth aspect of the invention includes the backlight device according to the first aspect, and a liquid crystal panel configured to form an image on a display surface of the liquid crystal panel when the liquid crystal panel is lighted by the backlight device from the backside of the liquid crystal panel.

Therefore, color temperature adjustment and correction of luminance unevenness and color unevenness for an image formed on the liquid crystal panel may be carried out. Further, the liquid crystal display apparatus with low power consumption may be realized at low cost.

Effect of the Invention

According to the backlight device and the liquid crystal display apparatus using the backlight device of the present invention, it is possible to adjust the color temperature and correct the color unevenness and the luminance unevenness at low cost. Especially, a practical effect for a large-sized liquid crystal television set is great.

EXPLANATION OF REFERENCE SIGNS

Figure 1:
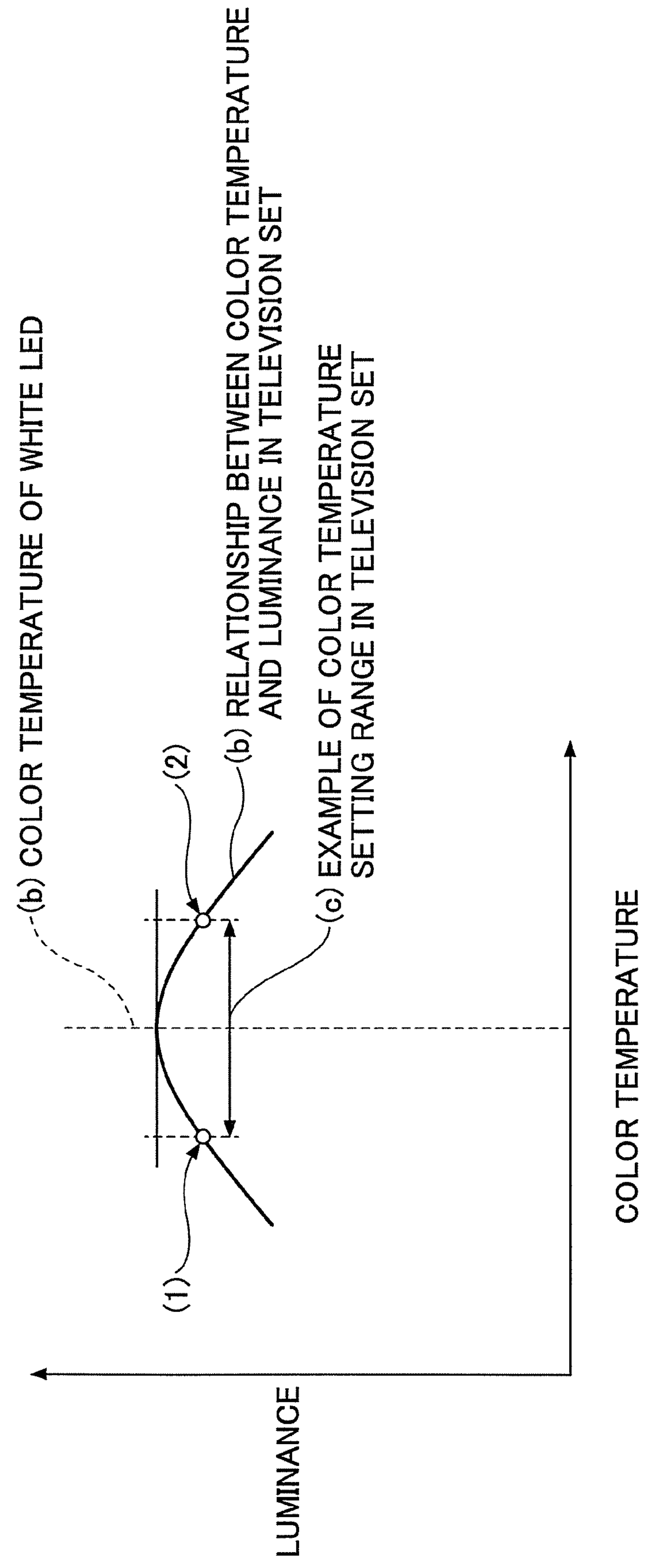
FIG. 1 illustrates a relationship between a color temperature and a luminance of a liquid crystal television set.
Figure 2:
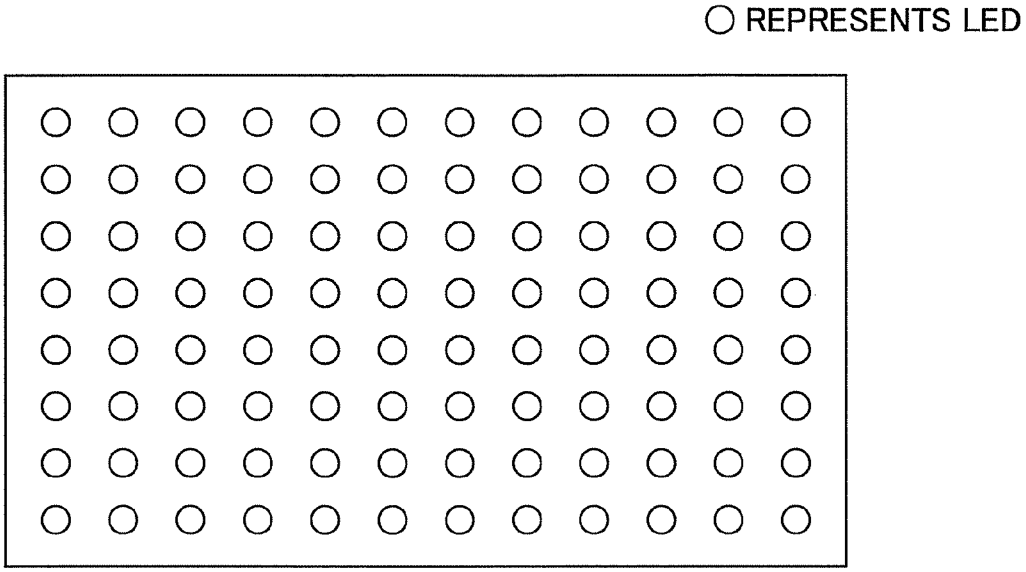
FIG. 2 illustrates types of backlight devices in liquid crystal panels.
Figure 2:
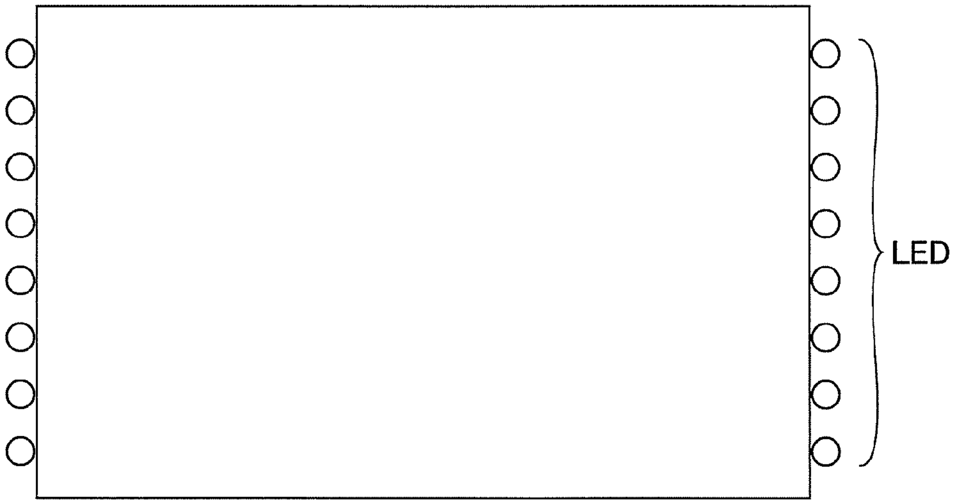
Figure 3:
FIG. 3 illustrates a conventional arrangement of light emitting diodes.
Figure 3:

10: light source
11: white (W) light emitting diode (LED)
12: red (R) light emitting diode (LED)
13: green (G) light emitting diode (LED)
14: blue (B) light emitting diode (LED)
15: colored light emitting diode (LED) portion
20: light source mounting substrate
30: backside casing

40, 40*a*: light emitting diode (LED) driving unit
41: pulse width modulating (PWM) circuit
42: white light emitting diode driving circuit (W driving circuit)
43: three primary colored light emitting diode driving circuit (RGB driving circuit)
44: sequential driving unit
50: light diffusing plate
60: optical sheet
61, 63: light diffusing sheet
62: lens sheet
70: front side frame
80: backlight device
90: liquid crystal panel
100: source driver
110: gate driver
120: liquid crystal panel controlling unit
130: image signal detecting circuit
150: liquid crystal display apparatus

BEST MODE FOR CARRYING OUT THE INVENTION

A best mode for carrying out the present invention is described in reference to figures. In the embodiment, a direct type backlight device is exemplified and described. However, the present invention is not limited to the direct type backlight.

Figure 4:
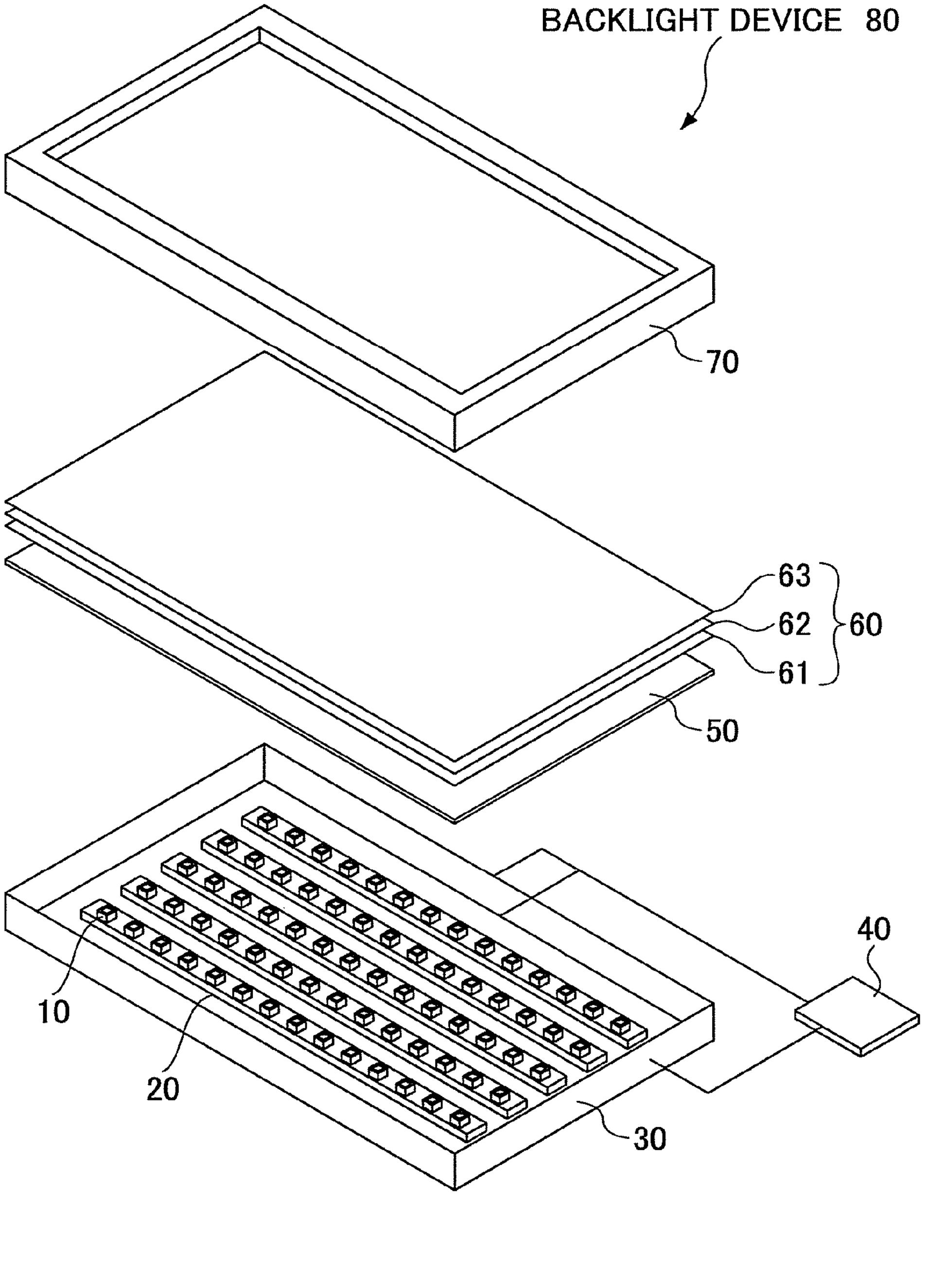
FIG. 4 is an exploded perspective view of a backlight device 80 of an embodiment.

FIG. 4 is an exploded perspective view of an entire structure of a backlight device 80 of an embodiment according to the present invention. Referring to FIG. 4, the backlight device 80 includes light sources 10, light source mounting substrates 20, a backside casing 30, a light emitting diode driving unit 40, a light diffusing plate 50, an optical sheet 60 and a front side frame 70.

The light source 10 is a unit configured to emit light to the backside of a liquid crystal panel. The backlight device 80 of the embodiment is formed by plural light emitting diodes. The plural light emitting diodes include both white light emitting diodes and colored light emitting diodes. The colored light emitting diodes may be a red (R) light emitting diode (ZED), a blue (B) light emitting diode (LED) and a green (G) light emitting diode (LED). A detailed arrangement of the white light emitting diodes and the colored light emitting diodes is described later.

The light source mounting substrates 20 are substrates on which to mount the light sources 10 with plural light emitting diodes. The light source mounting substrates 20 are arranged on and fixed to the inner bottom surface of the backside casing 30. The backlight device 80 of the embodiment is configured to laterally extend, and the light sources 10 are arranged on the light source mounting substrates 20 with predetermined intervals between the light sources 10. The plural light source mounting substrates 20 laterally extending are arranged substantially in parallel with predetermined intervals in the longitudinal direction. Thus, the light sources 10 are totally formed in a grid-like shape. By configuring the light sources 10 to have a direct type structure, it is possible to evenly emit light to the entire liquid crystal panel.

The backside casing 30 covers a back side of the back light device 80, and may be made of any material or various materials.

The light emitting diode driving unit 40 controls driving of the white light emitting diodes and the colored light emitting diodes of the light sources 10. The light emitting diode driving unit 40 controls lighting timings, lighting periods, and supplying electric current values or the like of the white (W) light emitting diodes and the colored light emitting diodes, to thereby adjust a color temperature exerted by the backlight device and correct luminance unevenness and color unevenness. The light emitting diode driving unit 40 may be formed by a predetermined electronic circuit or may be configured by including a Central Processing Unit (CPU), a Random Access Memory (RAM), a Read Only Memory (ROM), a microcomputer operated by a program, and the like. The driving control carried out by the light emitting diode driving unit 40 is later described in detail.

The light diffusing plate 50 is a plate having an optical diffusing effect of diffusing light. The light diffusing plate 50 diffuses the light emitted from the light sources 10.

The optical sheet 60 is formed by laminating the light diffusing sheet 61, the lens sheet 62 and the light diffusing sheet 63. The optical sheet 60 has a function of efficiently increasing the luminance of light diffused by the light diffusing plate 50. The light diffusing plate 50 and the optical sheet 60 form a light emitting surface of the backlight device 80.

The front side frame 70 covers and supports peripheral edges of the light diffusing plate 50 and the optical sheet 60. The outer shape of the backlight device 80 is formed by combining the front side frame 70 with the backside casing 30.

Figure 5:
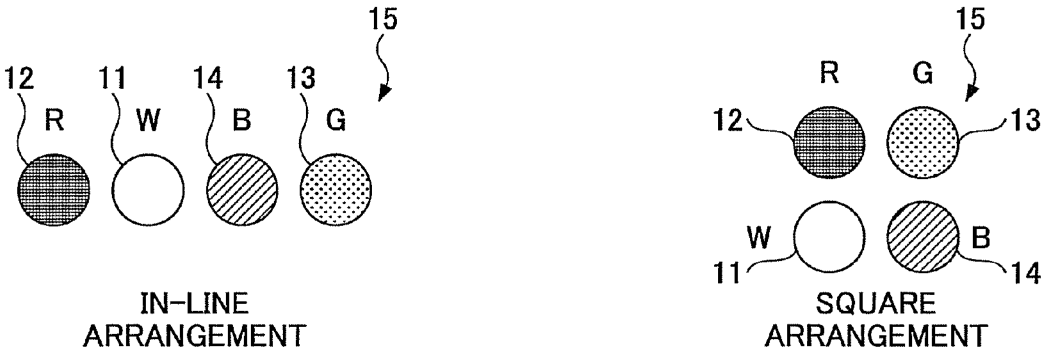
FIG. 5 illustrates an arrangement of light emitting diodes of an embodiment according to the present invention.
Figure 5:
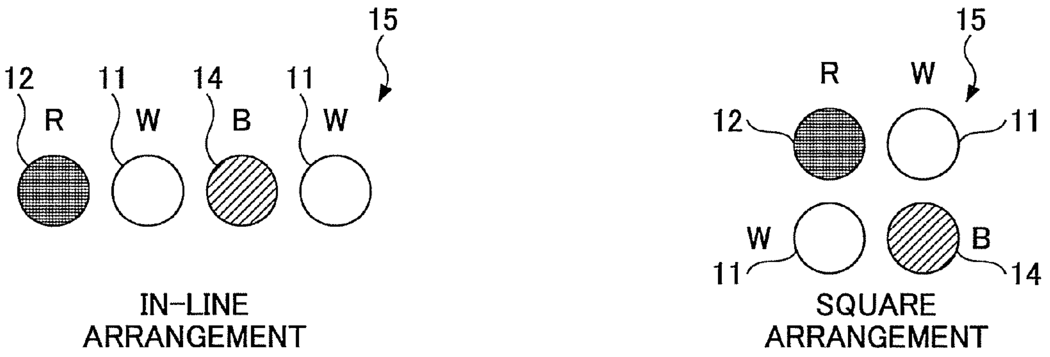

Referring to FIG. 5, an example of arranging the light emitting diodes forming the light sources 10 of the backlight device 80 of the embodiment is described. In the embodiment according to the present invention, the arrangement of the light emitting diodes using a red (R) light emitting diode, a green (G) light emitting diode and a blue (B) light emitting diode as colored light emitting diodes is illustrated in FIG. 5(*a*) W+RGB, and the arrangement of the light emitting diodes using a red (R) light emitting diode and a blue (B) light emitting diode as colored light emitting diodes is illustrated in FIG. 5(*b*) W+RB. However, the arrangement of the light emitting diodes is not limited to the above.

FIG. 5(*a*) illustrates an arrangement example using one white (W) light emitting diode 11, one red (R) light emitting diode 12, one green (G) light emitting diode 13 and one blue (B) light emitting diode 14 as the light source 10. Hereinafter, there is described a case of W+RGB of FIG. 5(*a*) where the white (W) light emitting diode 11 and the three primary color diodes 12, 13 and 14 are used. Hereinafter, these colored light emitting diodes are collectively referred to as a colored light emitting diode portion 15.

The left drawing of FIG. 5(*a*) illustrates an arrangement of the red (R) light emitting diode 12, the white (W) light emitting diode 11, the blue (B) light emitting diode 14 and the green (G) light emitting diode 13, laterally arrayed in this order sequentially from the left side. In this way, the one light source 10 may have an in-line arrangement arraying the white (W) light emitting diode 11, the red (R) light emitting diode 12, the green (G) light emitting diode 13 and the blue (B) light emitting diode 14 in a row. In this case, an example of a tuning ratio of colors is 1 for the white (W) light emitting diode and 0.33 each for the red (R) light emitting diode 12, the green (G) light emitting diode 13 and the blue (B) light emitting diode 14. By so determining the tuning ratio, various adjustments become easy because the colored light emitting diode portion 15 and the white (W) light emitting diode 11 balance when the colored light emitting diode portion 15 is lit to emit white light in its entirety.

The white (W) light emitting diode may exert most of the luminance of the entire backlight including the light source 10 by increasing the power of the white (W) light emitting diode 11. For example, it is possible to apply a high power type white (W) light emitting diode which can output a luminance per input power ratio exceeding 100 lm/W. On the other hand, the powers of the color (RGB) diodes 12, 13 and 14 are set small enough to be variable within a certain range (for example, ±1000 K) of color temperature.

Figure 6:
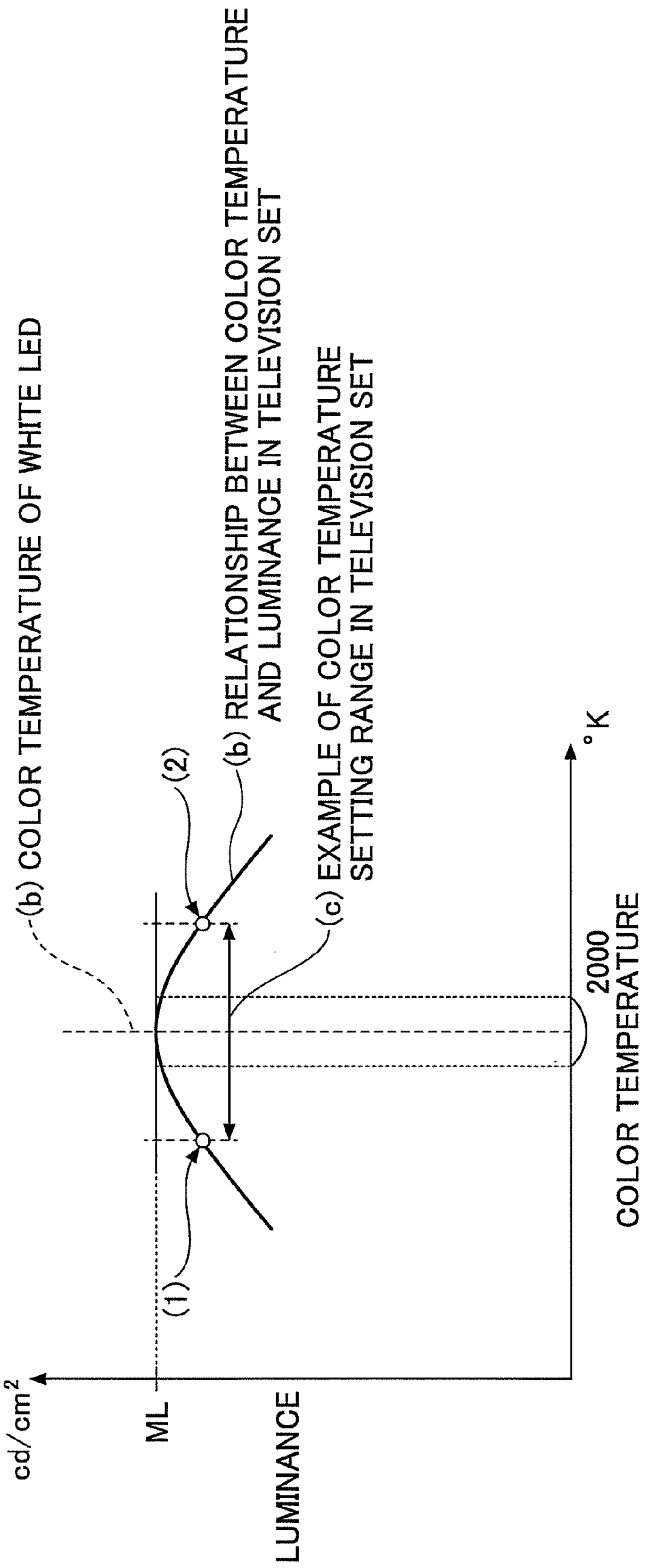
FIG. 6 illustrates a method of adjusting the color temperature of a light source.

FIG. 6 illustrates a method of adjusting the color temperature of the light source 10. Referring to FIG. 6, the white (W) light emitting diode undertakes, for example, 97% or more of the maximum luminance M. The color temperature represented by the abscissa axis of FIG. 6 is adjusted in a narrow range of 2000 K, i.e. ±1000 K. Then, it is possible to adjust the color temperature without largely varying the luminance.

The white (W) light emitting diode 11 is relatively low in cost in comparison with the colored light emitting diode portion 15. Therefore, the cost of the light source 10 may be lowered by using a high power type light emitting diode, which can emit light with a high luminance as the white (W) light emitting diode 11, and by using light emitting diodes, which can emit light having a power smaller than the high power type light emitting diode and a certain degree of luminance as the colored light emitting diode portion 15.

Referring back to FIG. 5, the right drawing of FIG. 5(*a*) illustrates an arrangement of the red (R) light emitting diode 12, the white (W) light emitting diode 11, the blue (B) light emitting diode 14 and the green (G) light emitting diode 13, arranged in the counterclockwise direction and in a square shape. The arrangement of the light source 10 may be such a square arrangement. In this case of the square arrangement, the tuning ratio of colors may be 1 for the white (W) light emitting diode and 0.33 each for the red (R) light emitting diode 12, the green (G) light emitting diode 13 and the blue (B) light emitting diode 14, in a manner similar to those in the in-line arrangement. Alternatively, the white (W) light emitting diode 11, the red (R) light emitting diode 12, the blue (B) light emitting diode 13 and the green (G) light emitting diode 14 may be arrayed in a longitudinal line, for example. It is possible to form the light source 10 in various arrangement patterns.

The light source 10 may be formed by collectively arranging the red (R) light emitting diode 12, the white (W) light emitting diode 11, the blue (B) light emitting diode 14 and the green (G) light emitting diode 13. Various patterns may be adopted as long as the red (R) light emitting diode 12, the white (W) light emitting diode 11, the blue (B) light emitting diode 14 and the green (G) light emitting diode 13, the numbers of which are one each, are collectively arranged. Referring to FIG. 5(*a*), there has been described the case where there is one of each of the red (R) light emitting diode 12, the white (W) light emitting diode 11, the blue (B) light emitting diode 14 and the green (G) light emitting diode 13. However, the number of the light emitting diodes may be increased depending on required characteristics of the backlight 80. For example, when high luminance is required, the light source 10 may include two white (W) light emitting diodes 11 and one each of the colored light emitting diodes 12, 13 and 14.

As described, in the embodiment illustrated in FIG. 5(*a*), a most part of the luminance of the backlight device 80 is exerted by the white (W) light emitting diode, relatively low in cost for obtaining the white light. Therefore, the power of the colored light emitting diode portion 15 can be lowered to reduce the cost, and therefore it is possible to reduce the price of the backlight device 80. Further, by controlling an electric current supplied to the red (R) light emitting diode 12 and/or the blue (B) light emitting diode 14, it is possible to control the color temperature of the backlight within a predetermined range. For example, when it is controlled to mainly emphasize the luminance and to slightly emphasize a hue, the colored light emitting diode portion 15 may have an output of 0.1 [W] or 0.2 [W], and the white (W) light emitting diode may have an output of 1 [W]. When the luminance is preferentially controlled by increasing the luminance, it is possible to control by either the white (W) light emitting diode 11 or the colored light emitting diode portion 15. However, when the luminance is controlled by increasing the luminance with the colored light emitting diode portion 15, it is necessary to increase the luminance of all the red (R) light emitting diode 12, the blue (B) light emitting diode 14 and the green (G) light emitting diode 13. Therefore, cost for the colored light emitting diode portion 15 increases. Further, if the luminance of the colored light emitting diode portion 15 is increased with respect to each of the colors, the luminance is greatly dispersed among the colored light emitting diodes 12, 13 and 14. Meanwhile, when the luminance of the white (W) light emitting diode 11 increases, it is sufficient to use the high power light emitting diode by increasing the luminance of only the one white (W) light emitting diode 11. Then, the above dispersion does not occur. For example, when the color temperature of the white (W) light emitting diode is 9000 K, and the color temperatures of the colored light emitting diodes are adjusted to be 2000 thru 3000 K, the following setting may be adopted. The power of the white (W) light emitting diode 11 is set to 1 [W], and the power of the colored light emitting diode portion 15 is set to about 0.1 [W].

Further, when there is luminance unevenness of the white (W) light emitting diode 11, the luminance unevenness may be corrected by adjusting a current supplied to the white (W) light emitting diode 11 or by controlling currents supplied to the colored light emitting diode portion 15. For example, when the luminance unevenness is adjusted by the colored light emitting diode portion 15 and the luminance of a certain area is low, the luminance is corrected by increasing the luminance exerted by the colored light emitting diode portion 15 at a position in the vicinity of this low luminance area. Contrary to the above description, when the colored light emitting diode is controlled to mainly change the hue and slightly emphasize the luminance, the colored light emitting diode portion 15 may include a light emitting diode having a luminance corresponding to an output of 1 [W], and the white (W) light emitting diode may have an output of 1 [W]. Then, the control may mainly emphasize the color temperature. As described, it is possible to flexibly combine the white (W) light emitting diode 11 and the colored light emitting diode portion 15 depending on a content of the control to be carried out and an intended end-usage.

A case is described where there is color unevenness in the white (W) light emitting diode 11. For example, when the color temperature of a certain area of the white (W) light emitting diode 11 is low, it is possible to correct the color temperature of the entire backlight by increasing the color temperature with the colored light emitting diode portion 15. The color temperature may be increased by reducing an electric current to the red (R) light emitting diode 12 at a position in the vicinity of the area having the low color temperature, and by increasing electric current of the blue (B) light emitting diode 14 at the position in the vicinity of the area having the low color temperature. When the color temperature is low, the color becomes dark orange. Along with increments of the temperature, it becomes yellowish white. When the temperature increases more, it becomes bluish white. Thus, by controlling electric currents of the red (R) light emitting diode 12 and the blue (B) light emitting diode 14, the color temperature can be adjusted or controlled.

Next, referring to FIG. 5(*b*), a case is described where two types of red (R) and blue (B) light emitting diodes are used as the colored light emitting diode portion 15. As described, depending on the electric currents supplied to the (R) light emitting diode 12 and the blue (B) light emitting diode 14, the color temperature is adjustable. Therefore, it is possible to make the white (W) light emitting diode 11 mostly undertake the luminance, and the colored light emitting diode portion may include only the red (R) light emitting diode 12 and the blue (B) light emitting diode 14.

FIG. 5(*b*) illustrates an arrangement of a light source 10 including white (W) light emitting diodes 11, a red (R) light emitting diode 12 and a blue (B) light emitting diode 14. The left drawing of FIG. 5(*b*) illustrates an arrangement of the red (R) light emitting diode 12, the white (W) light emitting diode 11, the blue (B) light emitting diode 14 and the white (W) light emitting diode 11, laterally arrayed in this order sequentially from the left side. As described, the white (W) light emitting diodes 11, the red (R) light emitting diode 12 and the blue (B) light emitting diode 14 may be laterally arrayed in line. In this case, color tuning ratios may be 0.5 each for the two white (W) light emitting diodes 11, and 0.5 each for the red (R) light emitting diode 12 and the blue (B) light emitting diode 14.

The right drawing of FIG. 5(*b*) illustrates an arrangement of the red (R) light emitting diode 12, the white (W) light emitting diode 11, the blue (B) light emitting diode 14 and the white (W) light emitting diode 11, arranged in the counterclockwise direction in a square shape. As described, the three colors of light emitting diodes 11, 12 and 14 may be arranged in the square arrangement. In this square arrangement, the color tuning ratios may be 0.5 each for the light emitting diodes 11, and 0.5 each for the red (R) light emitting diode 12 and the blue (B) light emitting diode 14, in a manner similar to those in in-line arrangement. Referring to FIG. 5(*b*), the number of the white (W) light emitting diodes 11 is two, the number of the red (R) light emitting diodes 12 is one; and the number of the blue (B) light emitting diodes 14 is one, and the white (W) light emitting diode 11, the red (R) light emitting diode 12 and the blue (B) light emitting diodes 14 are combined. In order to emphasize the luminance of the white (W) light emitting diodes 11, the above described combination may be applied. When the luminance of the white (W) light emitting diodes 11 is sufficient, the number of the white (W) light emitting diodes 11 may be one.

In a manner similar to that in FIG. 5(*a*), the arrangement of the white (W) light emitting diode 11, the red (R) light emitting diode 12 and the blue (B) light emitting diode 14 may have various arrangement patterns as long as a single light source 10 is formed by collectively arranging the white (W) light emitting diode 11, the red (R) light emitting diode 12 and the blue (B) light emitting diode 14.

In a case of the embodiment illustrated in FIG. 5(*b*), it is possible to correct luminance unevenness by adjusting electric currents supplied to the white (W) light emitting diodes 11, and correct color unevenness by adjusting electric currents supplied to the red (R) light emitting diode 12 and/or the blue (B) light emitting diode 14. The backlight device 80 using only the red (R) light emitting diode 12 and the blue (B) light emitting diode 14 as the colored light emitting diode portion 15 is especially suitable for a large-sized liquid crystal television set because the cost can be low.

Figure 7:
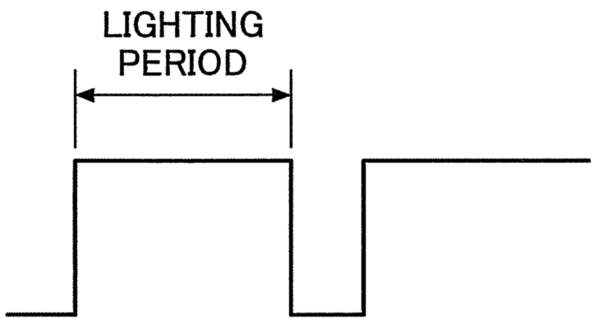
FIG. 7 illustrates lighting timings of a light emitting diode according to the present invention.
Figure 7:
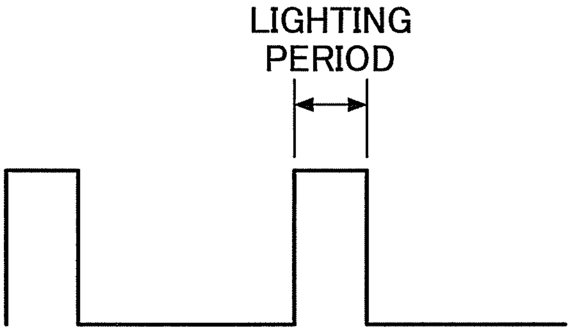

Next, referring to FIG. 7, driving of the light emitting diodes of the backlight device 80 of the embodiment according to the present invention is described. FIG. 7 is a timing chart illustrating a lighting timing of the light emitting diodes. Referring to FIG. 7, FIG. 7(*a*) illustrates a timing of supplying a current to the white (W) light emitting diode 11, and FIG. 7(*b*) illustrates a timing of supplying a current to a colored light emitting diode portion 15. As illustrated, the currents may not be simultaneously supplied to the white (W) light emitting diode 11 and the colored light emitting diode portion 15. Therefore, it is possible to reduce effective power.

Figure 8:
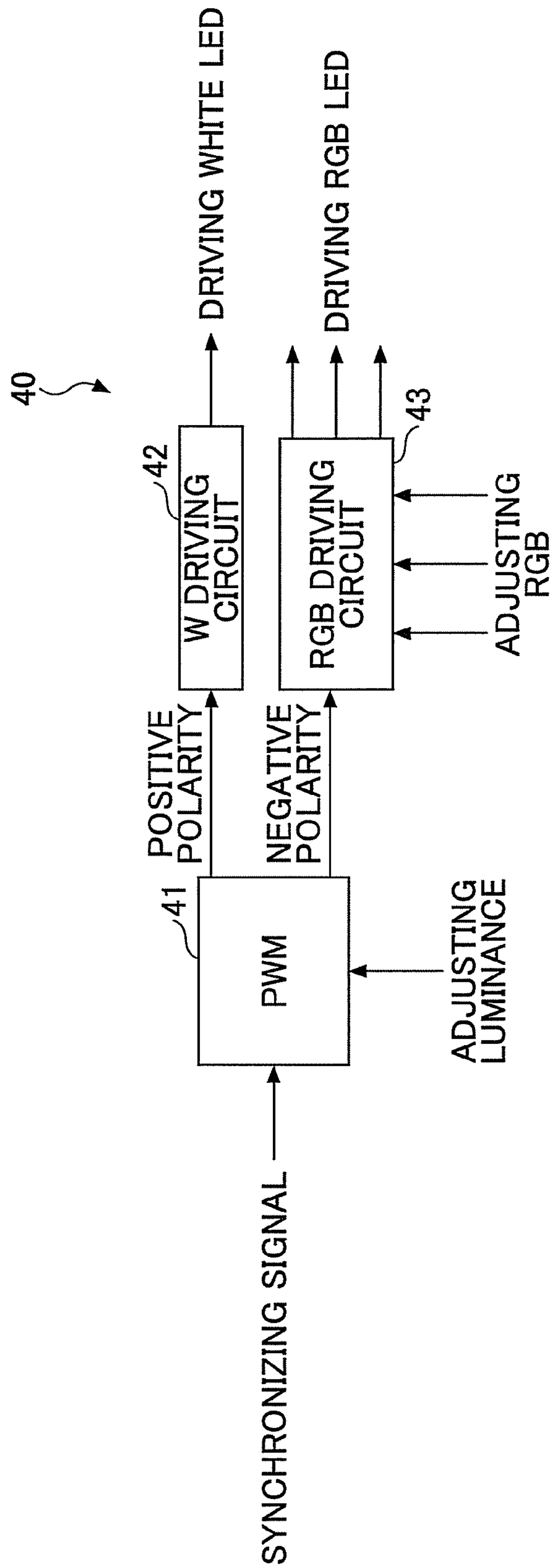
FIG. 8 illustrates a structure of a driving circuit of an embodiment according to the present invention.

An example of driving the light emitting diodes of the backlight device 80 is illustrated in FIG. 8. FIG. 8 illustrates an example of an inner structure of a light emitting diode (LED) driving unit 40. Referring to FIG. 8, the light emitting diode driving unit 40 includes a PWM circuit 41, a white (W) light emitting diode driving circuit (hereinafter, referred to as a W driving circuit) 42 and a colored light emitting drive circuit (hereinafter, referred to as a RGB driving circuit) 43. A pulse-width modulation circuit (PWM circuit) 41 illustrated in FIG. 8 sets on and off times of light emitting diodes 11, 12, 13 and 14. For example, the positive (first polarity) output of the PWM output is used for lighting the white (W) light emitting diode 11, and the negative (second polarity) output of the PWM output is used for lighting the colored light emitting diode portion 15. The W driving circuit 42 drives to light the white (W) light emitting diode 11. The W driving circuit 42 drives the white (W) light emitting diode 11 at a timing in synchronism with a pulse output timing of a positive output pulse from the PWM circuit 41. Further, the RGB driving circuit 43 drives to light the colored light emitting diode portion 15. The RGB driving circuit 43 drives the red (R) light emitting diode 12, the green (G) light emitting diode 13 and the blue (B) light emitting diode 14 in synchronism with a pulse output timing of a negative output pulse of the PWM circuit 41. By changing a pulse width of the PWM circuit 41, luminance is adjusted to be a predetermined level by controlling a current supplied to the white (W) light emitting diode 11. On the other hand, the negative output from the PWM circuit 41 adjusts levels of the three primary colors R, G and B to obtain a predetermined color temperature with the RGB driving circuit 43. The positive (first polarity) output and the negative (second polarity) output from the PWM circuit 41 can be substituted. For example, the negative pulse may be output to the W driving circuit 42 and the positive pulse may be output to the RGB driving circuit 43. In this case, the W driving circuit 42 may drive to light the white (W) light emitting diode 11 based on the negative output pulse. The RGB driving circuit 43 may drive to light the colored light emitting diode portion 15 based on the positive output pulse.

In the above driving method, the currents supplied to the light emitting diodes 11, 12 and 13 are determined by a duty cycle of the PWM output. Therefore, when the white (W) light emitting diode 11 adjusts the currents supplied to the white (W) light emitting diode 11 by changing the duty cycle, the currents to the colored light emitting diode portion 15 are influenced. Said differently, when the current supplied to the white (W) light emitting diode 11 increases, the current supplied to the colored light emitting diode 15 decrease. However, if the pulse width of the PWM circuit is previously set in consideration of dispersion of the white (W) light emitting diodes 11, it is possible to adjust the currents supplied to the R, G and B light emitting diodes 12, 13 and 14 with the RGB driving circuit 43.

Figure 9:
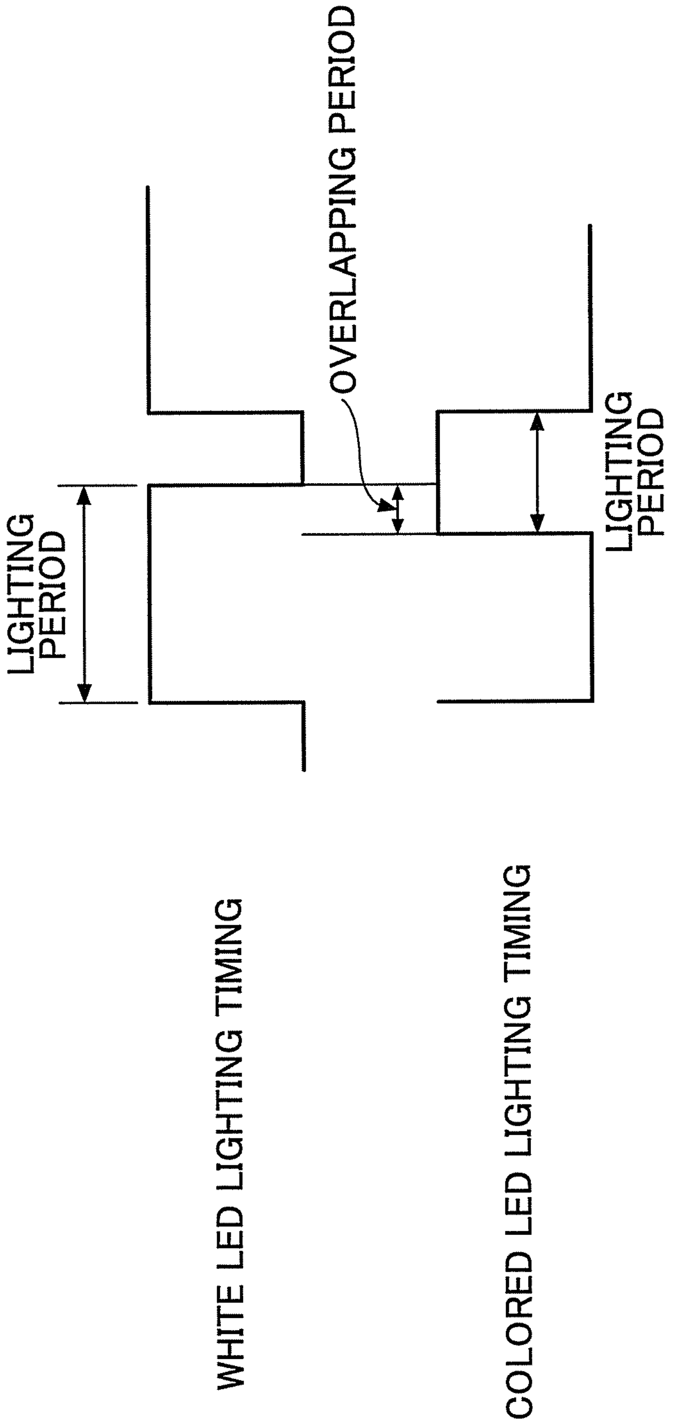
FIG. 9 illustrates lighting timings of a light emitting diode of another embodiment according to the present invention.

The above driving method uses the positive output from the PWM circuit for the white (W) light emitting diode 11 and the negative output for the colored light emitting diode portion 15. However, as illustrated in FIG. 9, lighting timings of the white (W) light emitting diode 11 and the colored light emitting diode portion 15 may partly be overlapped. In this case, the current supplied to the white (W) light emitting diode 11 and the currents supplied to the colored light emitting diode portion 15 are independently controlled. This control can be achieved by providing a control circuit, a microcomputer or the like, and independently controlling the W driving circuit 42 and the RGB driving circuit 43, for example as in FIG. 8. Alternatively, this control can also be achieved by driving the RGB driving circuit 43 to cause the RGB driving circuit 43 to receive the output signal from the PWM circuit 41 and to output the partly overlapped pattern.

Figure 10:
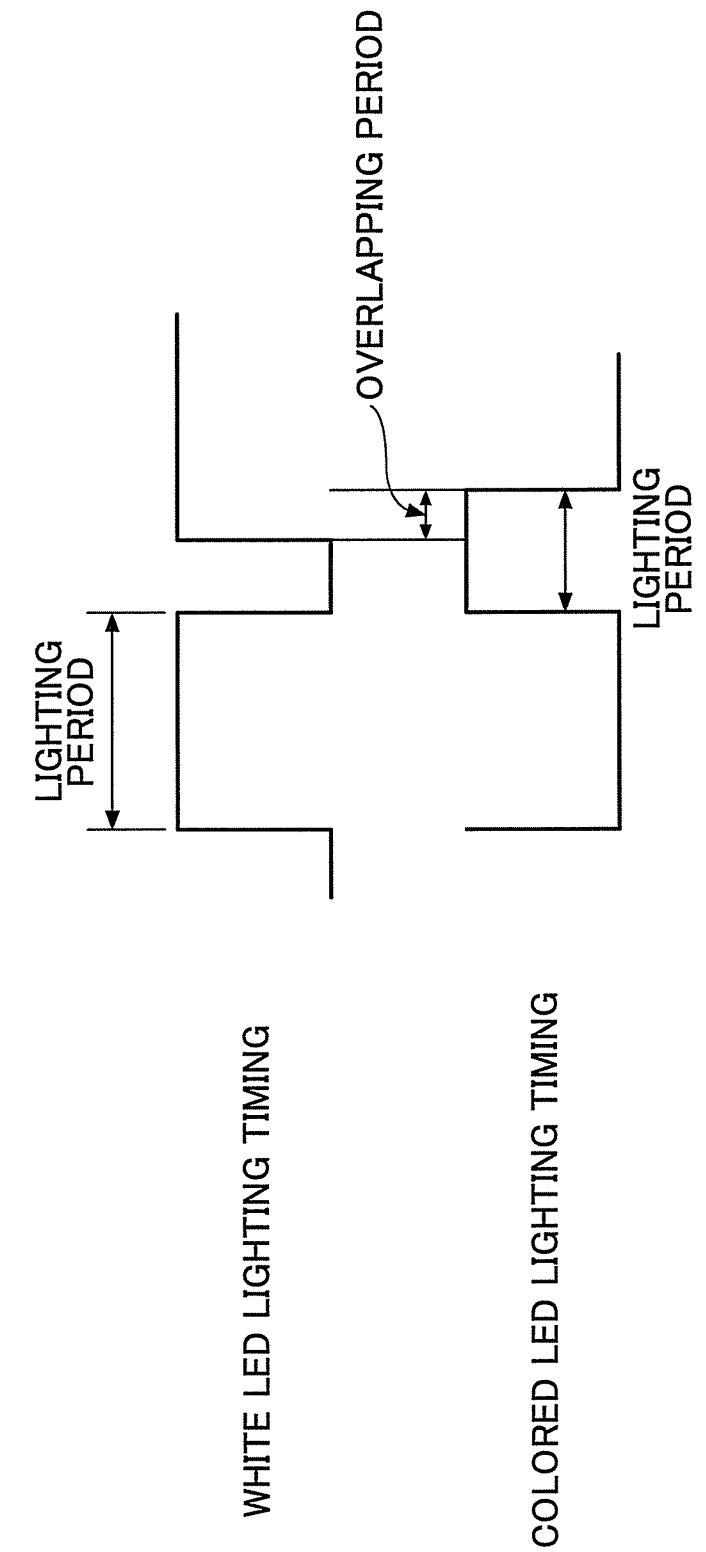
FIG. 10 illustrates lighting timings of a light emitting diode different from but partly the same as FIG. 9.

When the lighting timings of the white (W) light emitting diode 11 and the colored light emitting diode portion 15 partly overlap, a driving method illustrated in FIG. 10 may be adopted. FIG. 10 illustrates lighting timings from light emitting diodes different from but partly the same as FIG. 9. Referring to FIG. 9, an overlapping period of the lighting timings of the white (W) light emitting diode 11 and the colored light emitting diode portion 15 ends at a timing when the white (W) light emitting diode stops emitting the light. On the other hand, an overlapping period between the white (W) light emitting diode 11 and the colored light emitting diode portion 15 in FIG. 10 starts at a timing when the white (W) light emitting diode 11 starts to emit light. In case of the lighting pattern illustrated in FIG. 10, a negative pulse is output from the PWM circuit 41 illustrated in FIG. 8. If the lighting period is set longer when the colored light emitting diode portion 15 is lit by the RGB driving circuit 43 upon receipt of the negative pulse, it is possible to easily generate a driving pattern in which the driving patterns are partly overlapped.

Figure 11:
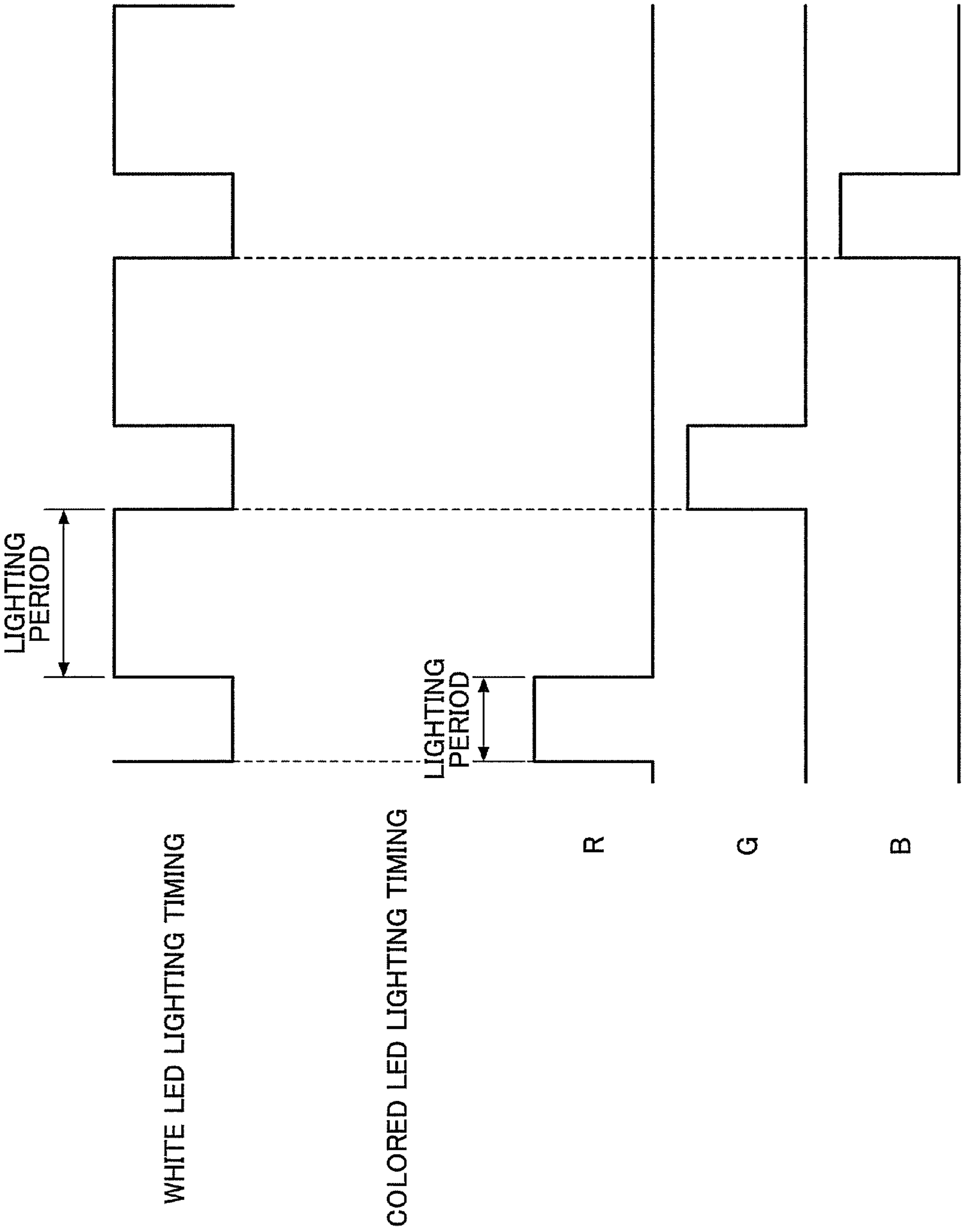
FIG. 11 illustrates lighting timings of a light emitting diode of another embodiment according to the present invention.

Next, another example of the driving method is described. A red (R) light emitting diode 12, a green (G) light emitting diode 13 and a blue (B) light emitting diode 14 are used as a colored light emitting diode portion 15, and the colored light emitting diode portion 15 is sequentially lit. The RGB driving circuit 43 generates timing signals as illustrated in FIG. 11 to drive the colored light emitting diode portion 15. Then, the red (R) light emitting diode 12, the green (G) light emitting diode 13 and the blue (B) light emitting diode 14 are sequentially lit. When the colored light emitting diode portion 15 is driven at the timings illustrated in FIG. 11, the numbers of times lighting each of the red (R) light emitting diode 12, the green (G) light emitting diode 13 and the blue (B) light emitting diode 14 may be reduced to one-third of the number of times lighting each of the diodes at a timing other than the timing illustrated in FIG. 11 within the same period. Therefore, the power consumption of the colored light emitting diode portion 15 may be reduced to about one-third of the power consumption at the timing other than the timing illustrated in FIG. 11.

Figure 12:
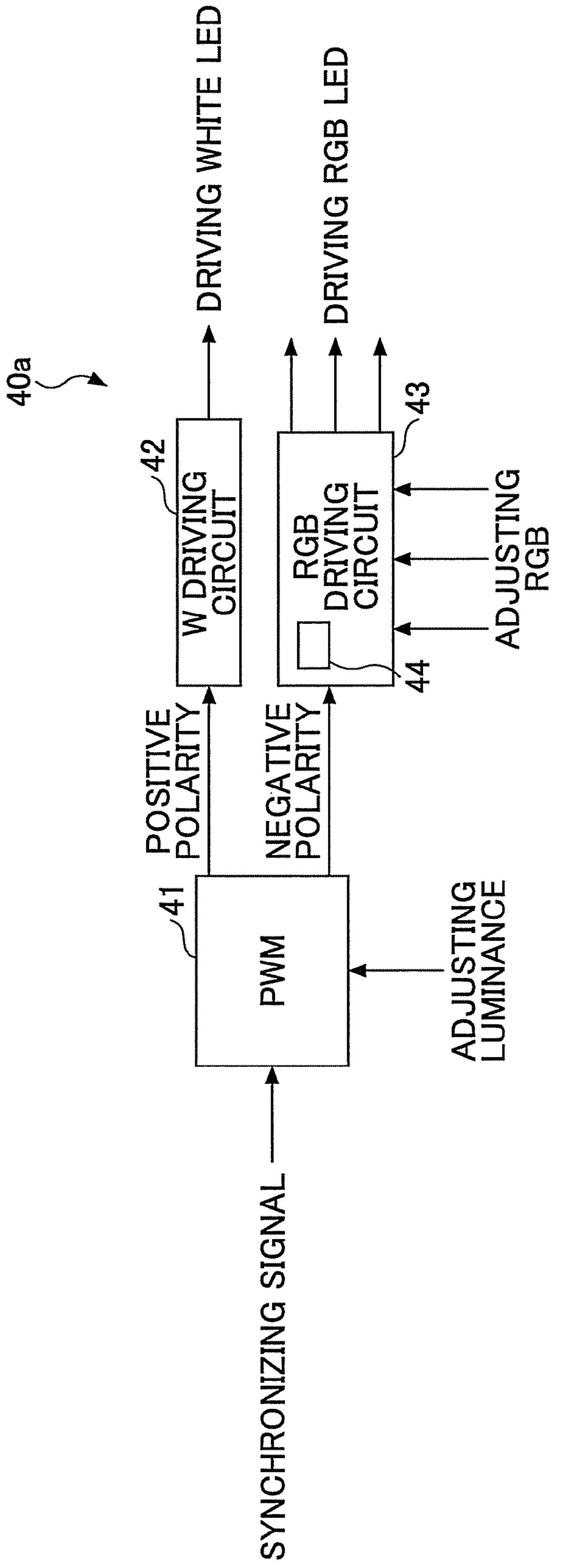
FIG. 12 illustrates an example of a light emitting diode driving unit 40*a* including a sequential driving unit 44.
Figure 13:
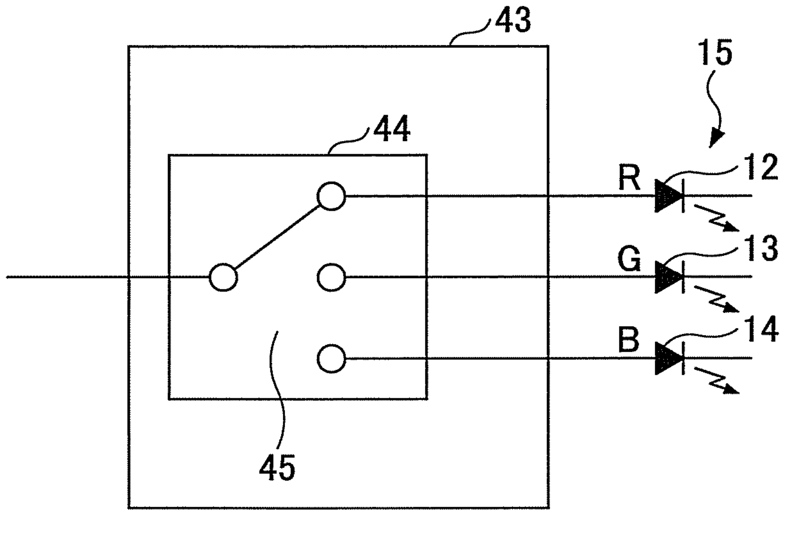
FIG. 13 illustrates an example of the structure of the sequential driving unit 44.

FIG. 12 illustrates an example of a light emitting diode driving unit 40*a* including a sequential driving unit 44. Referring to FIG. 12, the sequential driving unit 44 is installed in a RGB driving circuit 43. Because the other constitutional elements are the similar to those of the light emitting diode driving unit 40, description of these portions is omitted here. The sequential driving unit 44 receives a negative pulse from a PWM circuit 41, and sequentially switches a red (R) light emitting diode 12, a green (G) light emitting diode 13 and a blue (B) light emitting diode 14 in this order to thereby sequentially emit light. FIG. 13 illustrates an example of the structure of the sequential driving unit 44. Referring to FIG. 13, the sequential driving unit 44 includes a switching unit 45 configured to sequentially switch connections with the red (R) light emitting diode 12, the green (G) light emitting diode 13 and the blue (B) light emitting diode 14. The switching unit 45 may be various switching units such as a relay and a semiconductor element. Further, the sequential driving unit 44 may be realized by a unit utilizing software such as a programmable logic controller. As long as the colored light emitting diode portion 15 is sequentially driven, various units may be applied.

In this example, the colored light emitting diode portion 15 is sequentially lit while the white (W) light emitting diode does not emit light. However, as illustrated in FIG. 9 and FIG. 10, the lighting periods of the white (W) light emitting diode 11 and the colored light emitting diode portion 15 may partly overlap.

Figure 14:
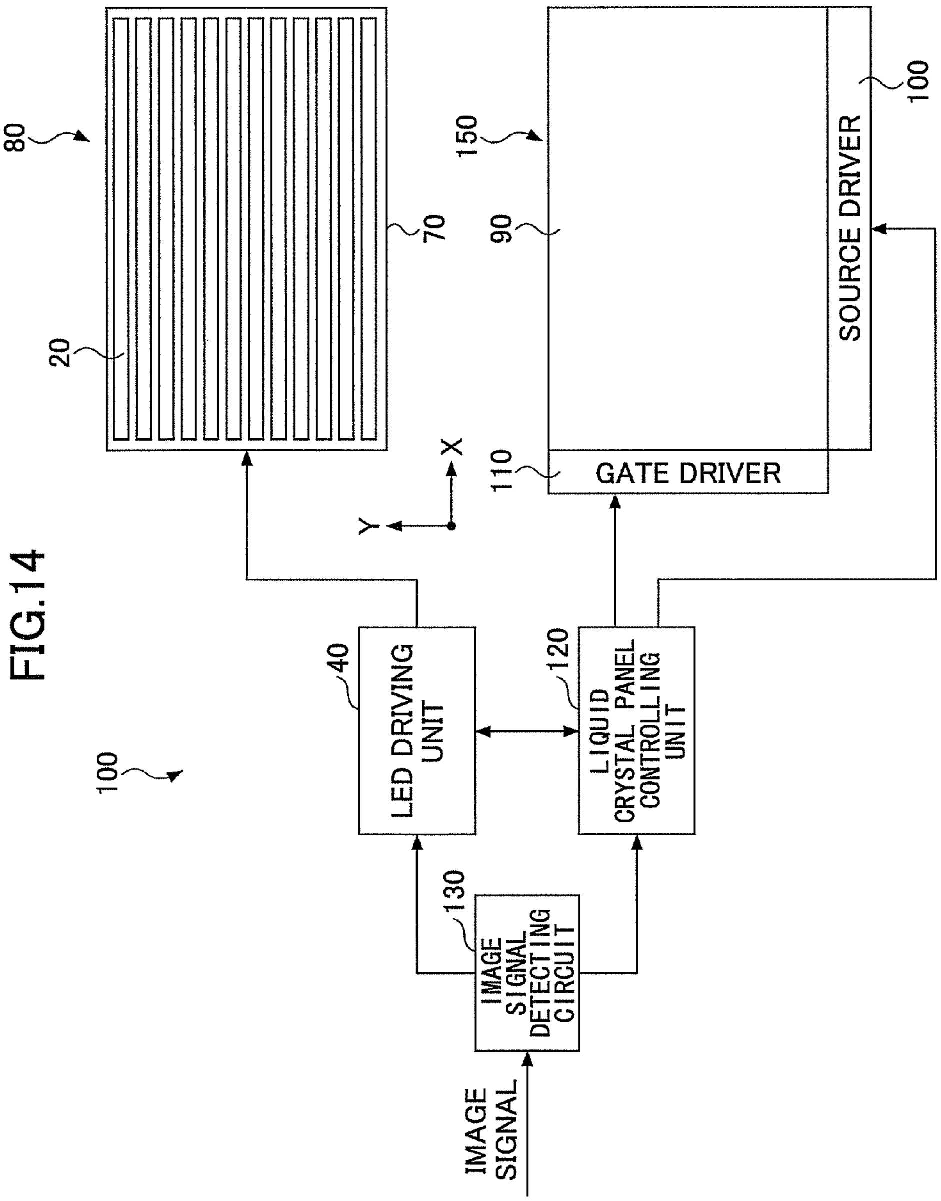
FIG. 14 illustrates an example of an entire structure of the liquid crystal display apparatus 150 of the embodiment.

Referring to FIG. 14, a liquid crystal display apparatus having the backlight device of the embodiment is described. FIG. 14 illustrates an example of an entire structure of the liquid crystal display apparatus 150 of the embodiment.

Referring to FIG. 14, the liquid crystal display apparatus 150 of the embodiment includes the backlight device 80, a liquid crystal panel 90, a source driver 100, a gate driver 110, a liquid crystal panel controlling unit 120 and an image signal detecting circuit 130.

The liquid crystal panel 90 is an image displaying unit which displays an image on a display surface thereof. The source driver 100 and the gate driver 110 are driving integrated circuits (IC) for driving the liquid crystal panel 90. The liquid crystal panel controlling unit 120 is a unit for controlling driving of the source driver 100 and the gate driver 110.

The image signal detecting circuit 130 is a circuit for detecting an input image signal. The liquid crystal panel controlling unit 120 and a light emitting diode driving unit 40 control driving based on the detected image signal. The liquid crystal panel controlling unit 120 drives the source driver 100 and the gate driver 110 at drive timings in correspondence with the image signal to thereby form an image on the liquid crystal panel 90. On the other hand, the light emitting diode driving unit 40 lights the light emitting diodes 11, 12, 13 and 14 of the backlight device 80 as illustrated. The detailed description of the light emitting diode driving unit 40 is similar to that described above. Therefore, the description is omitted. The backlight device 80 is located on a back surface of the liquid crystal panel 90. By emitting light from the backlight device 80, the image is formed on the display surface of the liquid crystal panel 90. At this time, adjustment of the color temperature, and correction of the color unevenness and the luminance unevenness may be easily carried out as described above. The light emitting diode driving unit 40 may be the light emitting diode driving unit 40*a* described in reference of FIG. 12.

Although the invention has been described with specific embodiments for a complete and clear disclosure, the appended claims are not to be thus limited but are to be construed as embodying all modifications and alternative constructions that may occur to one skilled in the art that fairly fall within the basic teachings herein set forth.

Especially, on and after FIG. 6 of the embodiment, there has been described the case where the colored light emitting diode portion 15 emits three colors with the red (R) light emitting diode 12, the green (G) light emitting diode 13 and the blue (B) light emitting diode 14. Needless to say, the embodiment may be applied to a case where the colored light emitting diode portion 15 emits only two colors with the red (R) light emitting diode 12 and the blue (B) light emitting diode 14 in a manner similar to the above.

Industrial Applicability

The present invention is applicable to a backlight device used in a liquid crystal display apparatus and the liquid crystal display apparatus.

This international application is based upon and claims the benefit of priorities of Japanese Patent Application No. 2007-243261 filed on Sep. 20, 2007 and Japanese Patent Application No. 2008-239735 filed on Sep. 18, 2008, and entire contents of which are incorporated herein by reference.

The invention claimed is:

1. A backlight device comprising:

a light source configured to light a liquid crystal panel from a back surface of the liquid crystal panel, wherein the light source includes:

a white light emitting diode, and a colored light emitting diode portion including a red light emitting diode having power smaller than power of the white light emitting diode, a blue light emitting diode having power smaller than power of the white light emitting diode, and a green light emitting diode having power smaller than power of the white light emitting diode; and a light emitting diode driving unit configured to turn on the white light emitting diode and the colored light emitting diode portion while shifting lighting timings of the white light emitting diode and of the colored light emitting diode portion, the light emitting diode driving unit including a pulse-width modulation circuit, a white light emitting diode driving circuit configured to turn on the white light emitting diode based on a pulse which is output from the pulse-width modulation circuit, and a colored light emitting diode driving circuit configured to turn on any single one of the red, blue, and green light emitting diode of the colored light emitting diode portion during each one of turning-on periods of turning on the white light emitting diode based on the pulse which is output from the pulse-width modulation circuit, said any single one of the red, blue, and green light emitting diodes being not turned on while another one of the red, blue, and green light emitting diodes is turned on, and the colored light emitting diode driving circuit including a sequential driving unit that switches connections with the red light emitting diode, the blue light emitting diode, and the green light emitting diode to sequentially light respective red, blue, and green light at least partly along with a white light emitted by the white light emitting diode, wherein the white light emitting diode undertakes 97% or more of a maximum luminance obtained by the light source to enable an adjustment of a color temperature in a range of ±1000 K using the colored light emitting diode portion without substantially varying a luminance obtained by the light source.

2. The backlight device according to claim 1, wherein the white light emitting diode is a high power type diode which exerts a luminance higher than that of the colored light emitting diode portion.

3. The backlight device according to claim 1, wherein the pulse has a first polarity and a second polarity, of which polarity is opposite to the first polarity, the white light emitting diode driving circuit turns on the white light emitting diode while the pulse of the first polarity is received and turns off the white light emitting diode while the pulse of the second polarity is received, and any one turning-on period of turning-on periods of turning on the red, blue, and green light emitting diodes includes a turning-off period of turning off the white light emitting diode.

4. A liquid crystal display apparatus comprising:

the backlight device according to claim 1; and a liquid crystal panel configured to form an image on a display surface of the liquid crystal panel when the liquid crystal panel is lighted by the backlight device from the backside of the liquid crystal panel.

* * * * *